W. G. WHEAT.
UNDERSLUNG ATTACHMENT FOR MOTOR VEHICLES.
APPLICATION FILED OCT. 14, 1919.
1,394,242.
Patented Oct. 18, 1921.
2 SHEETS—SHEET 1.
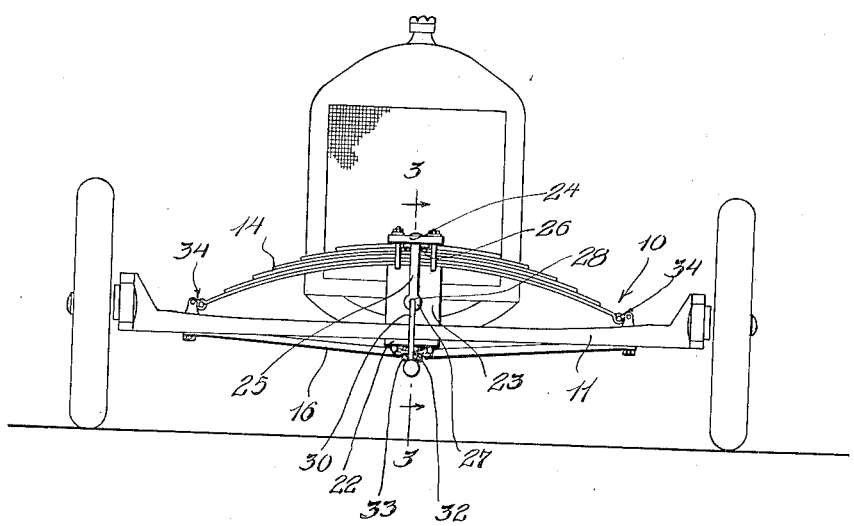
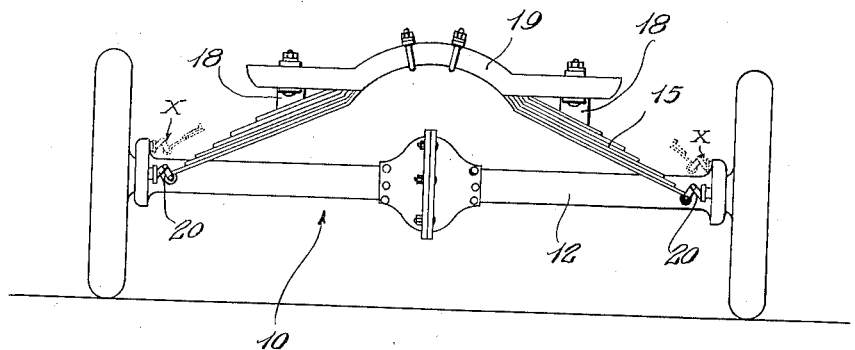
Inventor
William G. Wheat
By Victor J. Evans
Attorney
Witnesses W. G. WHEAT.
UNDERSLUNG ATTACHMENT FOR MOTOR VEHICLES.
APPLICATION FILED OCT. 14, 1919.
1,394,242.
Patented Oct. 18, 1921.
2 SHEETS—SHEET 2.
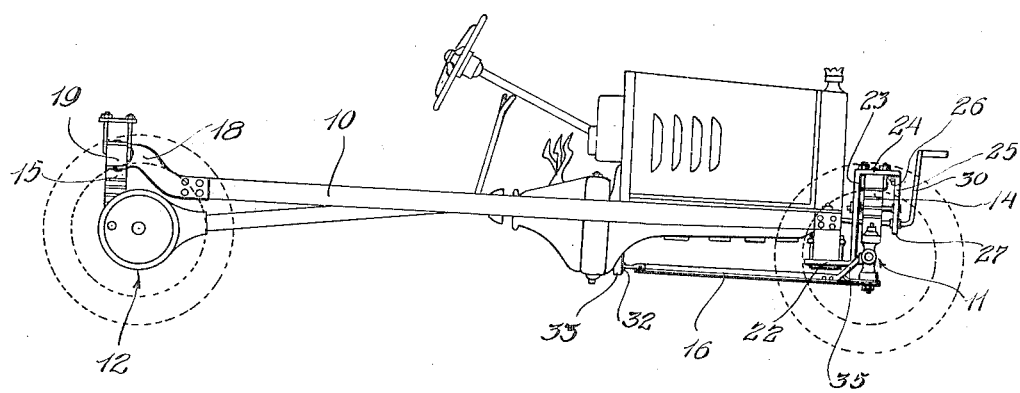
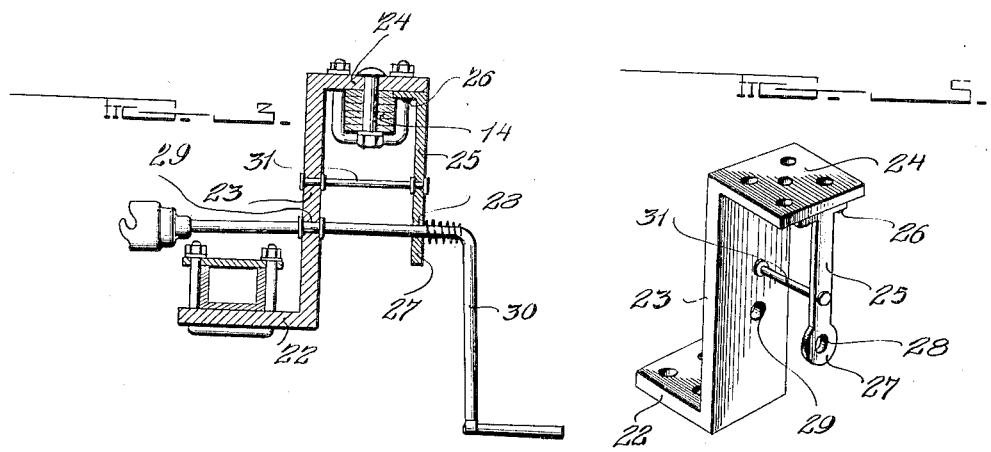
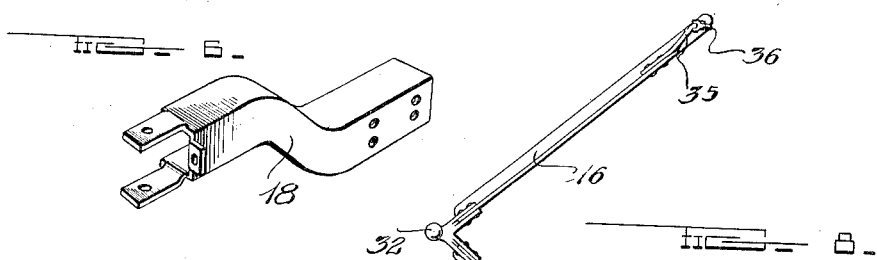
Inventor
William G. Wheat
By Victor J. Evans
Attorney
Witnesses

UNITED STATES PATENT OFFICE.

WILLIAM G. WHEAT, OF KANSAS CITY, MISSOURI.

UNDERSLUNG ATTACHMENT FOR MOTOR-VEHICLES.

1,394,242.  Specification of Letters Patent.  Patented Oct. 18, 1921.

Application filed October 14, 1919. Serial No. 330,646.

*To all whom it may concern:*

Be it known that I, WILLIAM G. WHEAT, a citizen of the United States, residing at Kansas City, in the county of Jackson and State of Missouri, have invented new and useful Improvements in Underslung Attachments for Motor-Vehicles, of which the following is a specification.

This invention comprehends the provision of an underslung attachment for motor vehicles, and is primarily designed for Ford cars; the object being to lower the body of the car so that it will hold the ground or surface when traveling at a high speed, the invention being particularly useful for Ford racers and speedsters.

The nature and advantages of the invention will be better understood when the following detail description is taken in connection with the accompanying drawings, the invention residing in the construction, combination and arrangement of parts as claimed.

In the drawings forming part of this specification like numerals of reference indicate similar parts in the several views and wherein:

Figure 1 is a front elevation of a Ford car constructed in accordance with the invention.

Fig. 2 is a rear elevation.

Fig. 3 is a sectional view taken on line 3—3 of Fig. 1.

Fig. 4 is a side elevation of a car showing the invention in use.

Fig. 5 is a perspective view of the front spring suspension bracket.

Fig. 6 is a similar view of the rear bracket.

Fig. 7 is a front or end view thereof.

Fig. 8 is a detail view of the front radius rod.

Referring to the drawings in detail 10 indicates the chassis, 11 and 12 the front and rear axles respectively, 14 and 15 the front and rear springs, while the front radius rod is indicated at 16. The invention embodies a rear bracket 18 which is substantially U-shaped, and which is bolted to the chassis 10 and the usual rear spring support 19. In use of the invention, it is necessary to cut off several inches at the rear of the chassis to apply the brackets 18. In Fig. 2 I have indicated at X the original position of the rear spring perch which is carried by the brake drum housing, and in the same figure it will be noted that the perch 20 has been lowered approximately three inches from its original position above the axle 12 to a position at the rear thereof. This obviously lowers the main frame or chassis.

In Fig. 5 I have shown in perspective the front spring suspension bracket, which is substantially Z-shaped, having one end 22 bolted or otherwise suitably secured beneath the machine, whereby the body 23 of the bracket is positioned between the radiator and the spring 14. The opposite end 24 of the bracket is suitably secured to the intermediate portion of the spring 14, the latter being suspended from the bracket in advance of the car. An arm 25 depends from the end 24 of the bracket to which it is secured as at 26, this arm terminating to provide an enlarged circular portion 27 having an opening 28 disposed in alinement with an opening 29 in the body portion of the bracket. A crank arm 30 of proper length is passed through said openings and journaled in the arm 25. The arm 25 is braced by means of a transverse rod 31 interposed between the arm and body portion of the bracket and secured to these parts as shown.

The radius rod 16 is provided with a ball 32 at one end which is received by a suitable bracket 33, these rods having their opposite ends secured to the front spring perch 34 at a point beneath the front axle 11. These rods are substantially of L-shaped formation in cross section. Projecting from the vertical flange of each rod is a bracket 35 carrying a bolt 36 which is secured to the front spring perch 34. It is manifest, that with a car constructed in this manner, the chassis will be brought closer to the ground similar to the well known underslung arrangement, and when applied on Ford cars, will have a tendency to hold the car to the ground when traveling at high speed. The machine, aside from having the rear of the chassis cut away a slight distance, and rearranging the rear spring perch, is not otherwise altered.

While I have shown and described what I consider the preferred embodiment of the invention I desire to have it understood that I do not limit myself in this connection and that such changes may be resorted to when desired as fall within the scope of what is claimed.

What is claimed is:

1. An underslung attachment for motor vehicles comprising means for supporting the rear spring of the machine whereby the terminals thereof are secured at points rearwardly of the adjacent axle, a substantially Z-shaped bracket having one end secured to the machine and its opposite end arranged in advance of the latter, means for securing the front spring of the machine to the latter mentioned end of the bracket with the body of the bracket arranged between the spring and radiator, a radius rod terminally connected with the adjacent extremities of the front spring, and the body portion of the bracket having an opening beneath the spring for the purpose specified.

2. An underslung attachment for motor vehicles comprising means for supporting the rear spring in a manner whereby the terminals thereof are secured at points rearwardly of the adjacent axle, a substantially Z-shaped bracket having one end secured to the machine and its opposite end disposed in advance thereof, means for suspending the front spring of the machine from the latter mentioned end of the bracket, a radius rod terminally connected with the adjacent ends of the spring, an arm depending from the forward end of the bracket in parallelism with the body thereof, and a brace rod connecting the said arm and body and arranged transversely of the spring.

3. An underslung attachment for motor vehicles comprising means for supporting the rear axle in a manner whereby the terminals thereof are secured at points rearwardly of the adjacent axle, a Z-shaped bracket having one end secured to the machine, and its opposite end arranged in advance thereof, means for suspending the front spring of the machine from the latter mentioned end, a substantially V-shaped radius rod having its terminals connected with the adjacent extremities of said spring, an arm depending from the forward end of the bracket, and said arm and body portion of the bracket having alined crank receiving openings.

In testimony whereof I affix my signature.

WILLIAM G. WHEAT.